United States Patent [19]

Carney, III

[11] 4,200,310
[45] Apr. 29, 1980

[54] ENERGY ABSORBING SYSTEM

[75] Inventor: John F. Carney, III, Mansfield, Conn.

[73] Assignee: State of Connecticut, Hartford, Conn.

[21] Appl. No.: 926,419

[22] Filed: Jul. 20, 1978

[51] Int. Cl.$^2$ .............................................. B62D 21/02
[52] U.S. Cl. ..................................... 280/784; 293/132
[58] Field of Search ...................... 296/28 R, 188, 189; 280/784; 293/102, 132, 133

[56] References Cited

U.S. PATENT DOCUMENTS

| | | | |
|---|---|---|---|
| 1,687,337 | 10/1928 | Jaeger | 293/146 |
| 3,608,943 | 9/1971 | Gostomski | 293/119 |
| 3,733,096 | 5/1973 | Kassbohrer | 293/133 |
| 3,848,886 | 11/1974 | Feustel | 296/28 R |
| 3,853,349 | 12/1974 | Moore | 296/28 R |
| 3,907,353 | 9/1975 | Dinitz | 293/102 |
| 4,008,915 | 2/1977 | Walker | 293/102 |
| 4,023,841 | 5/1977 | Wong | 293/142 |

Primary Examiner—Robert R. Song
Assistant Examiner—John A. Carroll
Attorney, Agent, or Firm—Arthur E. Fournier, Jr.

[57] ABSTRACT

An energy absorbing system, operable as an impact attenuation device for reducing the severity of vehicular collisions, comprising guidance frame means, energy absorbing means and impacting plate means. The guidance frame means, which is operable to secure one end of the energy absorbing system in fixed relation to an object, includes an attachment plate through which the guidance frame means is fastened at one end to the aforesaid object, structural tubing members having one end thereof secured to the attachment plate, first support means operable for supporting the structural tubing members and for securing the other end of the structural tubing members to the aforesaid object, and reinforcing means mounted on the structural tubing members operable to provide additional structural strength to the structural tubing members. The energy absorbing means, which function to absorb the energy released during the vehicular collision, includes a multiplicity of pipe sections connected together in series relation and supported in interposed relation between the guidance frame means and the impacting plate means. The impacting plate means, which is the portion of the energy absorbing system designed to be struck during the vehicular collision, includes a reinforced plate member, structural members having one end thereof supported in sliding relation within the structural tubing members of the guidance frame means, and second support means having one end fastened to the aforesaid object operable to provide additional vertical support to the energy absorbing system relative to the aforesaid object.

8 Claims, 9 Drawing Figures

ENERGY ABSORBING SYSTEM

The United States Government has rights in this invention pursuant to an Agreement between the Connecticut Department of Transportation and the Federal Highway Administration.

BACKGROUND OF THE INVENTION

My invention relates to impact attenuation devices, and more particularly to an energy absorbing system employable for reducing the severity of vehicular collisions, especially of the type involving a fast moving motor vehicle and a highway service vehicle engaged in highway maintenance and repair operations, from the standpoint of limiting the extent of injury suffered by people and the damage done to equipment as a consequence of such collisions.

It has long been known in the prior art to employ accident preventive measures in an effort to prevent and/or reduce the damage incurred by both humans and property resulting from vehicular collisions occuring on the Nation's major highways as well as its local roads. Such accident preventive measures may be classifiable for purposes of this discussion into two basic categories; namely, warning devices designed to be operative to forestall the occurrence of a vehicular collision, and protective devices designed to afford protection to both persons and property in the event of the occurrence of a vehicular collision.

By way of illustration, the category of warning devices is intended to include such items as conventional traffic signs and traffic signals, emergency signs and signals displayed to warn of the temporary existence of a dangerous situation, etc. Protective devices fall into two classes, i.e., those embodied in a vehicle as part of the construction thereof, and those which are viewed as being separate from the construction of the vehicle, irrespective of whether the latter are subsequently affixed in some manner to the exterior of the vehicle. Examples of protective devices, which fall within the first class, are such things as padded dashboards, seat belts, etc. In the second class are to be found such things as various types of safety barriers designed to afford protection in the event of a vehicular collision between a moving vehicle and an immovable object, or between a moving vehicle and another moving object. The present invention relates to a protective device of the type falling within the second class thereof as defined hereinabove.

Referring now in more detail to the aforesaid second class of protective devices, the nature of the immovable objects to which reference is had here are such things as bridge piers, light stanchions, guardrails, signposts, concrete walls and abutments, etc. Typically, an attempt is made to provide protection against a moving vehicle striking such immovable objects by positioning a stationary traffic safety barrier in proximity to the immovable object and so that it lies along the path, which the moving vehicle would most likely follow if it were to strike the immovable object. Such stationary traffic safety barriers are most often intended to function in the manner of an impact attenuation device; namely, to attenuate the forces produced as a result of the impact of the moving vehicle striking the immovable object, and thereby reduce the severity of the vehicular collision as relates to the extent of injury suffered by the individuals riding in the moving vehicle and the amount of property damage incurred by both the moving vehicle and the immovable object.

For ease of reference during the following discussion, such stationary traffic safety barriers will hereinafter be referred to as stationary energy absorbing barriers. One of the earliest attempts made at providing a stationary energy absorbing barrier involved the employment of a system composed of fifty-five gallon drums. Patterns were cut into the lids of the drums to reduce the crushing strength of the system, i.e., to provide the system with the desired controlled crushing characteristics.

The successful implementation of this fifty-five gallon drum modular crash cushion system prompted a study of the feasibility of employing other possible forms of stationary energy absorbing barriers. In this regard, corrugated steel pipe was found to have favorable characteristics when it was statically crush tested. Moreover, the availability of corrugated steel pipe having a wide range of thicknesses and diameter dimensions made it feasible to employ a polymodular design in which the physical characteristics of the stationary energy absorbing barrier could be varied on a row to row basis.

Examples of other forms of stationary energy absorbing barriers, which are known to exist in the prior art, include the following: a hydro cushion cell barrier composed of an array of water filled plastic cells operable such that upon impact, the water is ejected through orifices in the top of the cells at a controlled rate; a barrier formed by an array of nine to seventeen sand-filled frangible plastic barrels, which is characterized by its versatile applicability; a U-shaped tubular guardrail energy absorbing barrier that absorbs energy by means of the motion of supporting telescopic tubes such that upon impact, the impact forces are transmitted axially to arms, which contain many stainless steel torus elements that are squeezed between two cylindrical tubes; a barrier in the form of a vehicle arresting system that is composed of a steel entrapping net positioned across a roadway, and which is particularly applicable for use in proximity to locations such as road dead ends, ferry landings, highway medians at bridge overpasses, etc.; a lightweight cellular concrete crash cushion barrier constructed of easily frangible vermiculite concrete with vertical voids wherein the vertical voids contribute to the controlled crushing characteristics of the barrier; for use primarily as part of a guardrail system, a barrier based on a fragmenting tube concept, which was originally developed for use in planned lunar landing modules, and in which energy is absorbed by forcing a thick walled aluminum tube over a flared die, resulting in the shedding of the tube into small segments; and lastly, an energy absorbing barrier particularly applicable for use as part of a guardrail system and in which thick walled steel rings are utilized.

In addition to the potential for danger posed by immovable objects, which are to be found located along the Nation's major highways and along its local roads, there is another situation, which has the potential for danger that one often encounters while traveling along these same major highways and local roads. Reference is had here to the hazardous condition often posed by the presence on such highways and roads of men and equipment engaged in highway maintenance and repair operations. There is a need to protect such personnel and equipment from being struck by an errant moving vehicle. The stationary energy absorbing barriers which have been described herein previously, are generally found to be unsuited to provide the desired degree of protection to the personnel and equipment while involved in conducting highway and road maintenance operations. To provide this needed protection, what is required is an energy absorbing barrier which is portable in nature in contrast to the stationary nature of the energy absorbing barriers to which reference has previously been had herein.

Although most of the attention of the prior art heretodate has been directed towards providing various kinds of stationary energy absorbing barriers, there is known to exist in the prior art at least two different types of portable energy absorbing barriers, the latter more commonly being viewed as comprising a system. One such portable energy absorbing system is in the form of a hydro-cell system and consists of five rows of thirteen polyvinyl chloride plastic cells enveloped in a corset-like membrane. The entire unit is mounted on a metal platform, which is designed to be attached to the rear of a highway service vehicle. Each cell contains approximately three and one-half gallons of a water-calcium chloride solution. The latter solution functions to provide the system with the desired controlled crushing characteristics. The hydro-cell portable energy absorbing system, although being portable in nature and relatively easy to install has been found to suffer from the major disadvantage that it cannot simultaneously satisfy the energy absorption and minimum stopping distance, i.e., deceleration requirements for moving vehicles impacting thereagainst at speeds in excess of thirty miles per hour.

The other known form of portable energy absorbing system is the modular crash cushion system, which is composed of thirty steel drums, i.e., ten rows with three drums per row. The thirty drums rest on a trailer, which is designed to be attached to a highway service vehicle at five points to provide the required degree of horizontal and vertical stability during impact. The principal disadvantage of the modular crash cushion portable energy absorbing system stems from the fact that it is nineteen and one-half feet long. As a consequence, because of the need to maintain a rigid interconnection between the trailer and the towing service vehicle at all times, this system has been shown to suffer from severe wear limitations as concerns both the trailer on which the drums rest and the service vehicle which tows the trailer. In addition, because of its relatively long length, this system has proven to be unsuitable for use on the hilly and curved sections of highways and roads, which are found to exist in many areas of the country.

In summary, a need has been demonstrated for a new and improved portable energy absorbing system, suitable particularly for use in such applications as providing protection against being struck by an errant moving vehicle to men and equipment engaged in highway and road maintenance and/or repair operations. There are a number of characteristics, which it is desired that such a new and improved portable energy absorbing system should possess. Namely, the system should be capable of absorbing most of the energy dissipated in a high speed collision between a moving vehicle and a highway service vehicle. Moreover, the system should be capable of absorbing this energy in such a way that the accelerations and the acceleration rates to which the moving vehicle and the highway service vehicle are subjected as a consequence of a collision therebetween are within the guidelines specified by the Federal Highway Administration. Also, the use of the system should be unrestricted by the existence of hilly and/or curved sections of highways and roads. Furthermore, the system should be inexpensive to construct and employ. Lastly, the system should be suseptible to quick and inexpensive repair following its involvement in a vehicular collision.

OBJECTS OF THE INVENTION

It is therefore an object of the present invention to provide a novel and improved form of energy absorbing system operable as an impact attenuation device to reduce the severity of vehicular collisions.

It is another object of the present invention to provide such an energy absorbing system, which is capable of being employed either as a portable energy absorbing system or as a stationary energy absorbing barrier.

A further object of the present invention is to provide such an energy absorbing system, which is particularly suited for use in providing protection to men and equipment while the latter are engaged in the performance of highway maintenance and repair operations.

Yet another object of the present invention is to provide such an energy absorbing system, which is capable of dissipating the energy produced during a vehicular collision in such a way that the accelerations and acceleration rates to which vehicles are subjected during such collisions fall within the prescribed guidelines set by the Federal Highway Adminstration for such events.

Yet still another object of the present invention is to provide such an energy absorbing system, which is capable of being employed on hilly and curved sections as well as level and straight sections of highways and roads.

Yet still a further object of the present invention is to provide such an energy absorbing system, which is both inexpensive to construct and easy to employ.

Yet a final object of the present invention is to provide such an energy absorbing system, which is capable of being repaired quickly and inexpensively following its involvement in a vehicular collision.

SUMMARY OF THE INVENTION

In accordance with a preferred form of the invention there is provided a novel and improved energy absorbing system, which is operable as an impact attenuation system to reduce the severity of vehicular collisions occurring on the Nation's major highways as well as its local roads. The energy absorbing system embodies three major components; namely, a support vehicle guidance frame, energy absorbing members and an impacting plate assembly. The support vehicle guidance frame, which is operable to secure one end of the energy absorbing system in fixed relation to a support vehicle, includes an attachment plate through which the guidance frame is fastened at one end to the support vehicle, a pair of structural tubing members each having one end thereof secured to the attachment plate, a pair of support members operable for providing support to the pair of structural tubing members and for securing the other end of the pair of structural tubing members to the support vehicle, and reinforcing members mounted on each of the pair of structural tubing members operable to provide additional structural strength to the pair of structural tubing members. The energy absorbing members, which function to absorb the energy released during the vehicular collision, consist of four pipe sections connected together in series relation and supported in interposed relation between the guidance frame and the impacting plate assembly. The impacting plate assembly, which is the portion of the energy absorbing system designed to be struck during the vehicular collision, includes a reinforced plate member, a pair of structural members each having one end thereof supported in sliding relation in a respective one of the pair of structural tubing members of the guidance frame, and a pair of chain-like support members each having one end thereof attached to the reinforced plate member and the other end thereof fastened to the support vehicle operable to provide additional vertical support to the energy absorbing system relative to the support vehicle.

DETAILED DESCRIPTION OF A PREFERRED EMBODIMENT

Figure 1:
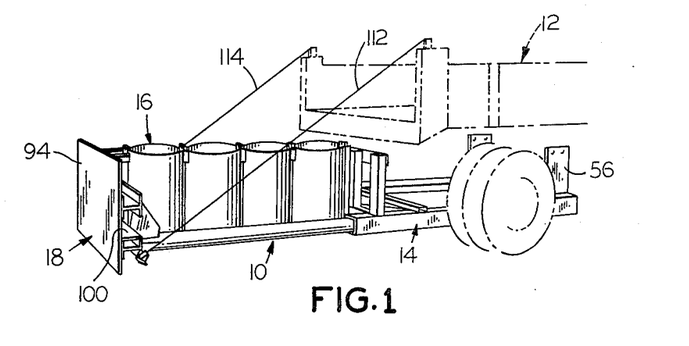
FIG. 1 is a perspective view of an energy absorbing system constructed in accordance with the present invention, illustrated assembled to a support vehicle, the latter being shown in phantom.

Referring now to the drawings, and more particularly FIG. 1 thereof, there is illustrated therein an energy absorbing system, generally designated by reference numeral 10, constructed in accordance with the present invention. As illustrated in FIG. 1, the energy absorbing system 10 is shown mounted to the rear of a highway service vehicle 12, only a portion of the latter being depicted in phantom in FIG. 1. The preferred method of utilization of the energy absorbing system 10 is as a portable energy absorbing system. More specifically, the energy absorbing system 10 is designed to be employed in association with a highway service vehicle 12 as a means of providing protection to men and equipment while the latter are engaged in highway and road maintenance and road operations, particularly insofar as concerns their being struck by an errant moving vehicle. However, as will be discussed more fully hereinafter, it is also to be understood that the energy absorbing system 10 can in addition be employed independent of a highway service vehicle 12 and/or in the manner of a stationary energy absorbing barrier.

Figure 5:
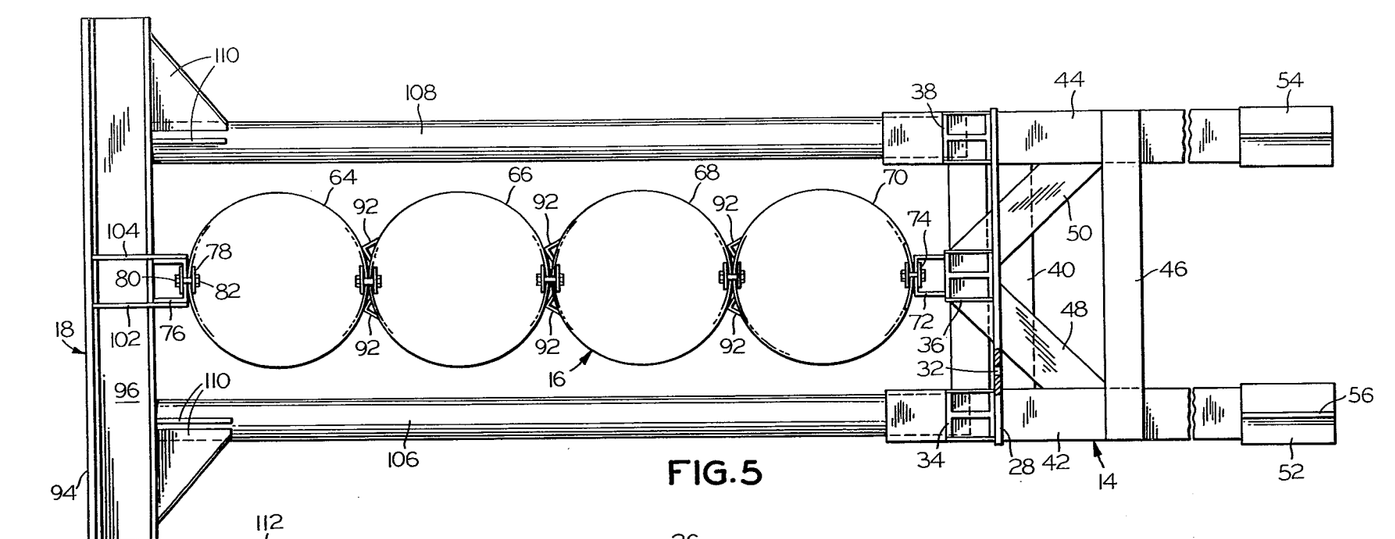
FIG. 5 is a top plan view of an energy absorbing system constructed in accordance with the present invention, illustrated in the uncollapsed state.

As best understood with reference to FIG. 5 of the drawings, the energy absorbing system 10 is composed of three major components; namely, a guidance frame generally designated by reference number 14, energy absorbing members generally designated by reference number 16, and an impacting plate assembly generally designated by reference numeral 18. It is important to note here that in order to ensure that the energy absorbing system 10 possesses the desired controlled crushing characteristics, it is essential that there exists a predetermined interrelationship between all three of the major components of which the energy absorbing system 10 is composed. The nature of this interrelationship will be described more fully subsequently herein.

A detailed description will now be had of each of the three major components of the energy absorbing system 10, commencing with the guidance frame 14. For this purpose, reference will be had in particular to FIGS. 4, 5 and 6 of the drawings. As viewed with reference thereto, the guidance frame 14 in accordance with the preferred embodiment of the invention functions to secure the energy absorbing system 10 in mounted relation on the rear of a highway service vehicle 12. In addition, the guidance frame 14 coacts with the energy absorbing members 16 and the impacting plate assembly 18 to effect the attenuation of the impact forces occasioned by the striking of the impacting plate assembly 18 by an errant moving vehicle.

Figure 4:
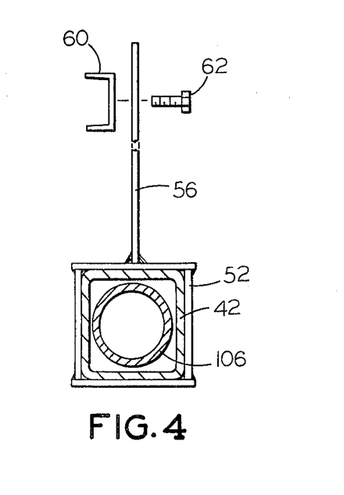
FIG. 4 is a cross-sectional view partially exploded of a portion of the guidance frame of an energy absorbing system constructed in accordance with the present invention, taken along the line 4—4 in FIG. 6 of the drawing.
Figure 6:
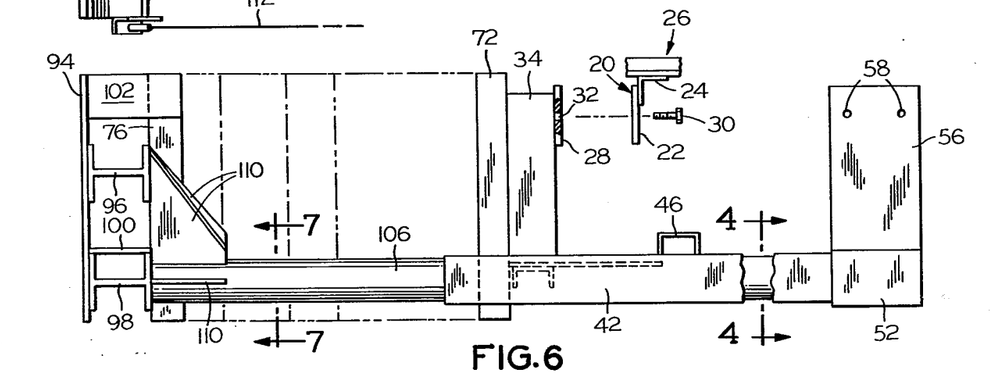
FIG. 6 is a side elevational view of an energy absorbing system constructed in accordance with the present invention, illustrated in the collapsed state.

With further reference to FIGS. 4, 5 and 6 of the drawings, the guidance frame 14 is fastened to the highway service vehicle 12 at two points. More specifically, as will be best understood with reference to FIG. 6 of the drawings, the aforereferenced fastening is accomplished at one point through the use of attachment means 20 consisting of a vertically oriented, longitudinally extending member 22 and an angle iron 24, the latter being preferably of lesser length than the member 22 and also being suitably secured to the latter member 22 such as by being welded thereto. The attachment means 20 itself is suitably secured to the highway service vehicle 12, such as by the angle iron 24 being welded to the under surface of a frame member, generally designated by reference number 26, of the highway service vehicle 12. In turn the member 22 of the attachment means 20 is secured to another vertically oriented, longitudinally extending member 28 by means of any suitable form of fastening means. For example, the latter fastening means may take the form of a pair of threaded fasteners 30 (only one of which is shown in the drawings) which are suitably received in a pair of spaced openings (not shown) provided for this purpose in the member 22 of the attachment means 20 and in a pair of openings 32 (only one of which is shown in the drawings), the latter being alignable with the openings (not shown) with which the member 22 of the attachment means 20 is provided.

Continuing with the description of the guidance frame 14, the member 28 is suitably secured, such as by being welded thereto, to the upper end of each of three vertically rising box-like members 34, 36 and 38. Obviously, the box-like members 34, 36 and 38 could embody other configurations, as long as the structural strength required to be possessed thereby exists, without departing from the essence of the present invention. As best seen with reference to FIG. 5 of the drawings, the box-like members 34, 36 and 38 are spaced along the length of the member 28, preferably in a manner so as to be equidistant one from another. The other end of each of the three box-like members 34, 36 and 38 is suitably secured to a horizontally extending plate 40 such as by being welded thereto. The horizontally extending plate 40 preferably spans essentially the entire width of the guidance frame 14. At each of its outer ends, the horizontally extending plate 40 is suitably connected through the use of any conventional form of securing means to an elongated structural tubing member 42 and 44, respectively.

In accordance with the preferred embodiment of the invention, the structural tubing members 42 and 44 are each approximately nine feet in length and are intended to extend under the body of the highway service vehicle 12 from the rear towards the center of the vehicle 12 for a portion of the length thereof. Moreover, for a purpose yet to be described, the structural tubing members 42 and 44, as best understood with reference to FIG. 4 of the drawings, are each of substantially hollow construction. Although as shown in the drawings, the structural tubing members 42 and 44 each embody a substantially square configuration, it is to be understood that the members 42 and 44 could embody another configuration without departing from the essence of the invention, as long as the structural strength required to be possessed thereby is maintained.

A channel-like member 46 is preferably provided in spaced relation to the plate 40. The member 46 is secured, through the use of any conventional form of securing means such as by being welded thereto, at each of its ends to a respective one of the structural tubing members 42 and 44, thereby providing additional strength and rigidity to the guidance frame 14. Further strength is imparted to the guidance frame 14, in accordance with the present invention, through the use of a pair of braces 48 and 50, which extend diagonally from the centermost box-like member 36 to a corresponding one of the structural tubing members 42 and 44. Any conventional form of securing means such as welding may be employed for purposes of securing the respective ends of the braces 48 and 50 to the box-like member 36 and the corresponding one of the structural tubing members 42 and 44.

The other end of each of the structural tubing members 42 and 44 is received in supported relation in a corresponding one of a pair of shoe-like members 52 and 54. As best understood with reference to FIG. 4 of the drawings, the members 52 and 54 each embody an internal configuration, which is complementary to the external configuration of the structural tubing members 42 and 44, whereby to enable the latter members 42 and 44 to be received in supported relation within the members 52 and 54. Although the external configuration of the members 42 and 44 and the internal configuration of the members 52 and 54 are depicted as being rectangular in nature, it is to be understood that other configurations could also be employed without departing from the essence of the invention as long as the complementary nature of the external configuration of the members 42 and 44 and the internal configuration of the members 52 and 54 is maintained. For purposes of receiving therein the end of a corresponding one of the structural tubing members 42 and 44, each of the shoe-like members 52 and 54 is open at one end. In accordance with the preferred embodiment of the invention, all of the other sides of the shoe-like members 52 and 54 are closed. In addition, the other end of each of the shoe-like members 52 and 54 is preferably also closed so as to provide a stop against which the end of the corresponding one of the structural tubing members 42 and 44 abuts.

Referring again particularly to FIGS. 4 and 6 of the drawings, as depicted therein each of the shoe-like members 52 and 54 is provided with a vertically extending support member 56 (only one of which is shown in the drawings). Each of the latter members 56 has one end thereof secured such as by welding to the top surface of a corresponding one of the shoe-like members 52 and 54. Adjacent the free end thereof, each of the support members 56 is preferably provided with a pair of openings 58. The openings 58 are employed for purposes of accomplishing the second point of attachment of the guidance frame 14 to the highway service vehicle 12. More specifically, as shown in FIG. 4 of the drawings, the support members 56 and thereby the guidance frame 14 is fastened to the highway service vehicle 12 and more particularly, a portion of the frame 60 thereof through the use of suitable fastening means, which may take the form of threaded fasteners 62 (only one of which is shown in the drawings). The fasteners 62 are passed through the openings 58 provided for this purpose in the support members 56 and are received in openings (not shown) provided for this purpose in the frame 60. The latter openings (not shown) in the frame 60 may be unthreaded whereupon nuts would be utilized to effect a tight securement of the threaded fasteners 62, or else the openings (not shown) in the frame 60 may be threaded whereupon the threaded fasteners 62 would be received in threaded engagement therewithin.

A description will now be had of the second major component of the energy absorbing system 10; namely, the energy absorbing members which are generally designated by reference numeral 16 in the drawings. In accordance with the preferred embodiment of the invention, the energy absorbing members 16 comprise four sections of steel pipe 64, 66, 68 and 70. The function of the steel pipes 64, 66, 68 and 70 is to enable the energy released during impact to be absorbed in a controlled manner whereby the accelerations and the acceleration rates to which the striking vehicle and the highway service vehicle 12 are subjected fall within the limits specified in the guidelines promulgated by the Federal Highway Administration. To this end, it has been found that the major components of the energy absorbing system 10 must bear a predetermined relationship to each other. Insofar as concerns the steel pipes 64, 66, 68 and 70, it is important that in absorbing the energy released during impact the steel pipes 64, 66, 68 and 70 collapse in a predetermined manner. Namely, as viewed with reference to FIG. 5 of the drawings, the steel pipes 64, 66, 68 and 70 collapse in accordance with a prescribed pattern with the collapse of the steel pipe 64 being effected first, followed by the collapse in turn of the steel pipe 66, the steel pipe 68 and finally the steel pipe 70. The extent of collapse to which each of the steel pipes 64, 66, 68 and 70 is subjected is obviously a function of the amount of energy, which the steel pipes 64, 66, 68 and 70 are required to absorb as a consequence of the impact. In turn, the amount of energy released as a consequence of the impact is basically a function of the weight and the speed of the striking vehicle at the time of impact, the weight and speed of the highway service vehicle 12 at the time of impact, and the point at which the striking vehicle impacts the energy absorbing system. For example, it has been demonsrated through tests that where the striking vehicle weighs two thousand two hundred sixty pounds and impacts the energy absorbing system 10 at a velocity of forty-five point eight miles per hour, the highway service vehicle 12 weighs sixteen thousand pounds and is stationary, and the striking vehicle impacts the energy absorbing system 10 at an angle of zero degrees and along the centerline of the service vehicle 12, the steel pipes 64, 66, 68 and 70 are caused to collapse from a pre-impact diameter of twenty-four inches to a post-impact diameter measured along the major axis of the service vehicle 12 of five and one-half inches for the steel pipe 64, nine inches for the steel pipe 66, six inches for the steel pipe 68, and nineteen inches for the steel pipe 70. The latter collapsed condition of the steel pipes 64, 66, 68 and 70 is illustrated in FIG. 6.

Figure 2:
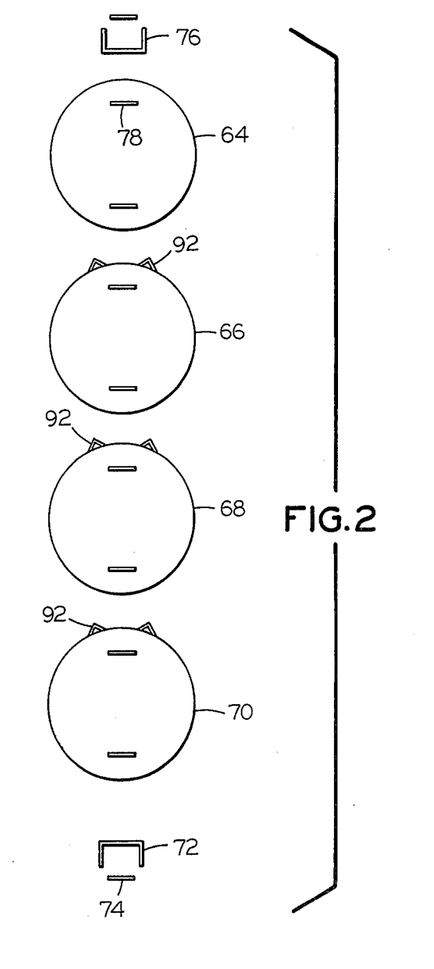
FIG. 2 is an exploded top plan view of the energy absorbing members of an energy absorbing system constructed in accordance with the present invention.

Continuing with the description of the energy absorbing members 16, the steel pipes 64, 66, 68 and 70 are interconnected in series relation. Moreover, as will be best understood with reference to FIGS. 2 and 5, the steel pipes 64, 66, 68 and 70 are also interconnected to the guidance frame 14 and the impacting plate assembly 18 whereby the impact forces imparted to the impacting plating assembly 18 are transmitted therefrom to the steel pipes 64, 66, 68 and 70. In accordance with the preferred embodiment of the invention, for purposes of securing the steel pipe 70 to the guidance frame 14, a substantially U-shaped member 72 is provided, which is secured through the use of any suitable conventional form of securing means such as by being welded thereto, to the outer surface of the centermost box-like member 36. The fastening of the steel pipe 70 to the guidance frame 14 is actually effected through the cooperation of the U-shaped member 72 and another vertically rising member 74. The U-shaped member 72 and the member 74 preferably extend the length of the steel pipe 70, and are secured together adjacent both the top and the bottom of the steel pipe 70 through the use of threaded fasteners (not shown) and nuts (not shown). The threaded fasteners (not shown) are passed through suitable openings (not shown) provided for this purpose in the members 72 and 74, and are received in threaded engagement in cooperating nuts (not shown).

The energy absorbing members 16 are interconnected to the impacting plate assembly 18 in a similar fashion. Namely, the steel pipe 64 is secured to the impacting plate assembly 18 by means of a substantially U-shaped member 76 and another vertically oriented member 78. The latter members 76 and 78 which are preferably at least equal in length to the steel pipe 64 are secured together adjacent both the top and the bottom of steel pipe 64 by means of threaded fasteners 80, which are passed through suitable openings (not shown) provided for this purpose in the members 76 and 78, and are secured in threaded engagement in cooperating nuts 82. Only the uppermost threaded fastener 80 and cooperating nut 82 are visible in FIG. 5 of the drawings.

Figure 3:
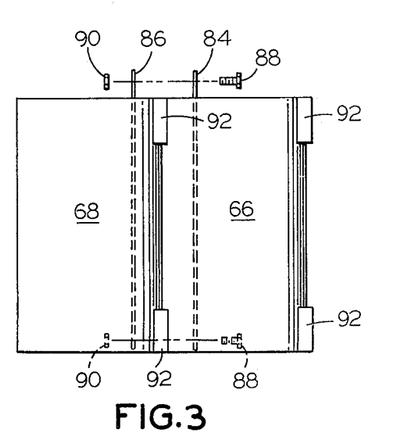
FIG. 3 is a partially exploded side elevational view of a pair of energy absorbing members of an energy absorbing system constructed in accordance with the present invention, illustrating the manner in which the energy absorbing members are fastened together.

Completing the description of the energy absorbing members 16, the steel pipes 64, 66, 68 and 70 are secured together in a manner best understood with reference to FIG. 3 of the drawings. As illustrated in the latter Figure, the steel pipes 66 and 68 are secured together by means of a pair of vertically oriented members 84 and 86. The latter members 84 and 86, which as shown in FIG. 3 are longer in length than the steel pipes 66 and 68, are secured together through the use of threaded fasteners 88 and cooperating nuts 90. More specifically, the members 84 and 86 are secured together adjacent both the top and the bottom of the steel pipes 66 and 68 by means of the threaded fasteners 88, which are passed through openings (not shown) provided for this purpose in the members 84 and 86 and are received in threaded engagement in the nuts 90. The members 84 and 86 are preferably secured together externally of the steel pipes 66 and 68 adjacent the top of the latter, and are secured together internally of the steel pipes 66 and 68 adjacent the bottom of the latter. To this end, the steel pipes 66 and 68 are each provided with openings (not shown) adjacent the bottom end thereof suitably dimensioned to enable a threaded fastener 88 to be received therein. Although not illustrated in the drawings in the interest of maintaining clarity of illustration therein, it is to be understood that the steel pipe 64 is secured to the steel pipe 66 in a similar manner, and that the steel pipe 68 is also secured to the steel pipe 70 in a similar fashion.

In accordance with the preferred embodiment of the invention, angles 92 are preferably interposed between the steel pipes 64, 66, 68 and 70 in order to ensure that the steel pipes 64, 66, 68 and 70 collapse as planned. More specifically, as best understood with reference to FIG. 3 and 5 of the drawings, a pair of substantially V-shaped angles 92 are welded in spaced relation to each other adjacent both the top and the bottom of each of the steel pipes 70, 68 and 66. The effect thereof is to ensure that angles 92 are interposed between the steel pipe 70 and the steel pipe 68, between the steel pipe 68 and the steel pipe 66, and between the steel pipe 66 and the steel pipe 64. The angles 92 function to ensure that the energy released during the impact is transmitted in series from one steel pipe to another, etc., and to obviate the tendency for one or more of the steel pipes 64, 66, 68 and 70 to move sideways relative to the axis of impact, i.e., relative to the longitudinal axis of the energy absorbing system 10.

Figure 7:
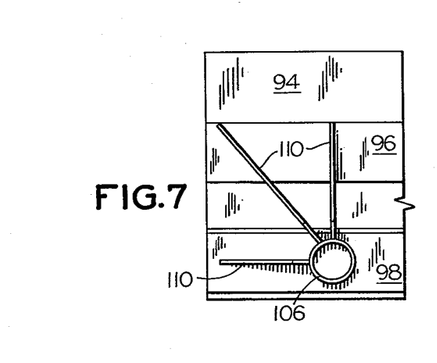
FIG. 7 is a cross-sectional view of a portion of the impacting plate assembly of an energy absorbing system constructed in accordance with the present invention, taken along the line 7—7 in FIG. 6 of the drawings.

Turning now to a description of the third major component of the energy absorbing system 10, i.e., the impacting plate assembly 18, reference will be had for this purpose principally to FIGS. 5, 6 and 7 of the drawings. As shown in the drawings, the impacting plate assembly 18 includes a reinforced plate 94 preferably made of aluminum. Approximately at the center of the reinforced plate 94 there is suitably secured to the inner surface thereof such as by welding a horizontally extending I-beam 96, which extends substantially the entire width of the plate 94. In addition, a second horizontally extending I-beam 98 is also suitably secured such as by being welded thereto to the inner surface of the plate 94 adjacent the bottom thereof. Like the I-beam 96, the I-beam 98 also preferably extends the entire width of the reinforced plate 94. As best understood with reference to FIG. 1 of the drawings, a horizontally extending stiffening plate 100 is secured such as by welding to the inner surface of the reinforced plate 94 so as to extend outwardly therefrom in perpendicular relation thereto and so that the outer edge portion of the stiffening plate 100 is secured in abutting relation to the upper edge surface of the I-beam 98 as viewed with reference to FIG. 1.

Continuing with the description of the impacting plate assembly 18, a pair of support members 102 and 104 extend outwardly from the inner surface of the reinforced plate 94 adjacent to the top thereof. The support members 102 and 104 are mounted substantially at the center of the plate 94, and so as to extend substantially perpendicular thereto. The support members 102 and 104 may be secured to the plate 94 in any conventional manner such as by being welded thereto. The function of the support members 102 and 104 is to provide a mounting surface for the U-shaped member 76, which has previously been described hereinabove. As will be best understood with reference to FIGS. 5 and 6 of the drawings, the support members 102 and 104 extend outwardly from the plate 94 a sufficient distance so as to present a substantially flush surface with the outer surface of the U-shaped member 76. The latter member 76 is also preferably secured such as by being welded to the vertically extending surface of the I-beam 96 and to the vertically extending surface of the I-beam 98.

Completing the description of the impacting plate assembly 18, the latter further includes a pair of structural members 106 and 108, which are suitably dimensioned so as to be receivable for sliding movement within the structural tubing members 42 and 44 of the guidance frame 14. More specifically, the structural members 106 and 108, which in accordance with the peferred embodiment of the invention are each approximately nine feet in length, are each secured at one end thereof such as by being welded to the vertically extending surface of the I-beam 98. As best understood with reference to FIG. 5 of the drawings, the structural members 106 and 108 are spaced substantially the same distance from the nearest end of the I-beam 98. To provide additional strength and rigidity to the structural members 106 and 108 a multiplicity of gussets 110 are preferably secured in abutting relation to the I-beam 98 and the structural members 106 and 108. More specifically, the gussets 110 preferably each have a portion thereof welded to the I-beam 98 and another portion which is welded either to the structural member 106 or to the structural member 108. Finally, for purposes of providing additional vertical support to the energy absorbing system 10, a pair of support members 112 and 114 are preferably employed. The support members 112 and 114, which may take the form of a chain-like member, or a straight rod are suitably secured through the use of any conventional form of securing means (not shown) in such a manner as to have one end thereof fastened to the impacting plate assembly 18 and the other end thereof fastened to the rear of the highway service vehicle 12 as illustrated in FIG. 1 of the drawings.

Figure 8:
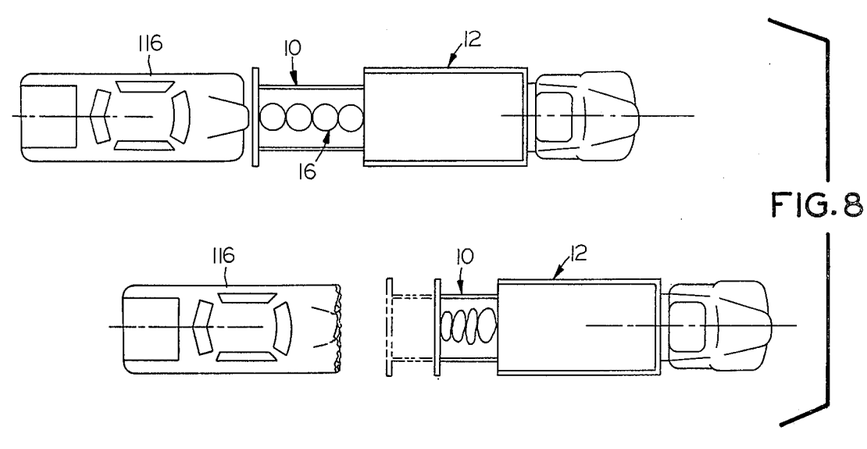
FIG. 8 is a schematic representation of a vehicle impacting against an energy absorbing device constructed in accordance with the present invention that is mounted on a support vehicle, and illustrating the pre-impact and the post-impact positions of the impacting vehicle, the major components of the energy abosrbing system and the support vehicle when the impact occurs at an impact angle of zero degrees and along the centerline of the support vehicle.
Figure 9:
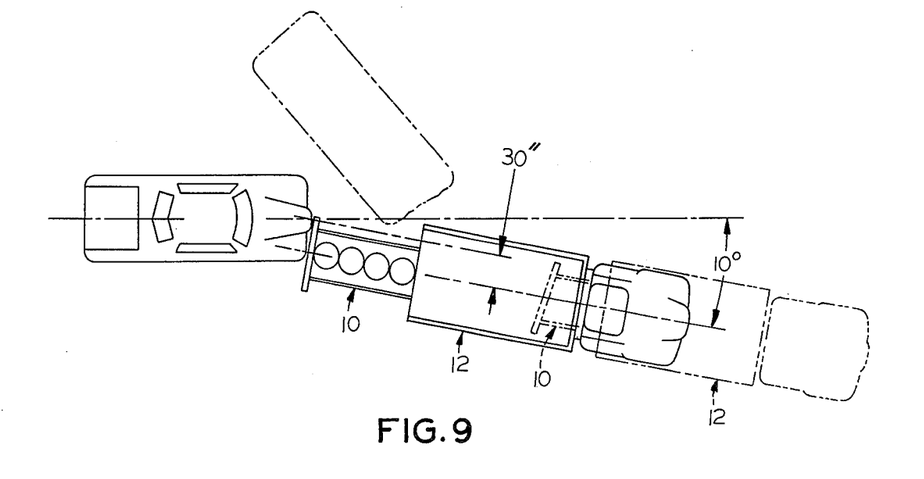
FIG. 9 is a schematic representation of a vehicle impacting against an energy absorbing device constructed in accordance with the present invention that is mounted on a support vehicle, and illustrating the pre-impact and the post-impact positions of the impacting vehicle, the major components of the energy absorbing system and the support vehicle when the impact occurs at an impact angle of ten degrees and at an offset of thirty inches from the centerline of the support vehicle.

Turning now to a description of the method of operation of the energy absorbing system 10, reference will be had for this purpose particularly to FIGS. 8 and 9 of the drawings. In accordance with the preferred method of employment of the energy absorbing system 10, the latter is mounted on the rear of a highway service vehicle 12. Moreover, the primary function of the energy absorbing system 10 is to afford protection against being struck by an errant moving vehicle to men and equipment employed in highway and road maintenance and repair operations. To this end, the highway service vehicle 12 equipped with the energy absorbing system 10 would generally be positioned so as to be the first piece of equipment that is encountered by an oncoming vehicle.

With particular reference to FIGS. 8 and 9 of the drawings, there is schematically represented therein the pre-impact and the post-impact positions of a striking vehicle 116, the energy absorbing members 16 of the energy absorbing system 10, and the highway service vehicle 12. As will be best understood with reference to FIG. 8, upon impact the energy released as a consequence of the vehicle 116 striking the reinforced plate 94 is absorbed by the steel pipes 64, 66, 68 and 70. More specifically, the effect of the impact is to cause the steel pipes 64, 66, 68 and 70 to collapse. Namely, the striking vehicle 116 forces the reinforced plate 94 to move towards the rear of the highway service vehicle 12. This movement of the reinforced plate 94 is accommodated by the fact that the structural members 106 and 108 are suitably supported so that the latter will slide within the structural tubing members 42 and 44 when a force is applied to the outer surface of the reinforced plate 94, as for example on the occasion of the vehicle 116 impacting against the plate 94.

In turn as the reinforced plate 94 moves toward the rear of the highway service vehicle 12, the steel pipes 64, 66, 68 and 70 are caused to collapse in series in accordance with a predetermined pattern so as to provide the energy absorbing system 10 with the desired controlled crushing characteristics. The extent to which each of the steel pipes 64, 66, 68 and 70 collapses as mentioned previously hereinabove is a function of the weight and speed of the striking vehicle 116 at the time of impact, the weight and speed of the service vehicle 12 at the time of impact, and the angle of impact. The objective obviously is to minimize the extent of injury suffered by the occupants of both the striking vehicle 116 and the service vehicle 12, and the amount of property damage incurred by both the striking vehicle 116 and the service vehicle 12. In this regard, it is important that the reinforced plate 94 be suitably dimensioned so as to ensure that the striking vehicle 116 in striking the plate 94 does not become wedged under the plate 94 or does not catapault over the plate 94. Accordingly, it has been found that suitable dimensions for the plate 94 are that it be approximately six feet in width and thirty-four inches in height. Also, in accordance with the preferred embodiment of the invention, the steel pipes 64, 66, 68 and 70 are each two feet in diameter and thirty-four inches in height. In addition, the steel pipes 64 and 66 both preferably have wall thicknesses of one-quarter inch, while the steel pipes 68 and 70 each embody wall thicknesses of three-eight inches. Finally, the steel pipe 64 is also preferably provided with two vertical slots (not shown) each approximately twenty inches long located in a plane extending perpendicular to the centerline of the highway service vehicle 12 and so as to be positioned on opposite sides of the steel pipe 64. The function of the two vertical slots (not shown) is to reduce the magnitude of the initial onset force occasioned by the striking vehicle 116 impacting against the plate 94.

Although the energy absorbing system 10 is primarily intended to be utilized in conjunction with a highway service vehicle 12, it is also possible without departing from the essence of the present invention to employ the energy absorbing system 10 as a stationary energy absorbing barrier. This can be accomplished by securing the guidance frame 14 to an object other than a highway service vehicle 12. In this regard, the nature of the object to which the guidance frame 14 and thereby the energy absorbing system 10 is attached must be taken into consideration in order to ensure that the energy absorbing system 10 possesses the desired controlled crushing characteristics. Namely, as has been noted previously herein, the amount of energy released during impact, which is required to be absorbed by the energy absorbing members 16 of the energy absorbing system 10 is a function of several factors including the weight and speed of the object to which the guidance frame 14 is secured at the time of impact. Consequently, it may be necessary when employing the energy absorbing system 10 as a stationary barrier to utilize steel pipes 64, 66, 68 and 70 that are of different dimensions that those given above, if the object to which the guidance frame 14 is secured does not embody substantially the same weight as the highway service vehicle 12. In addition, if the object is immovable as contrasted to the highway service vehicle 12, which even though stationary at the time of impact will be caused to move by the force of the impact, consideration will have to be given to the need to dissipate the additional kinetic energy, which in the case of the highway service vehicle 12 is dissipated by virtue of the movement of the vehicle 12.

Thus, in accordance with the present invention there has been provided a novel and improved form of energy absorbing system operable as an impact attenuation device to reduce the severity of vehicular collisions. The subject energy absorbing system of the present invention is capable of being employed either as a portable energy absorbing system or as a stationary energy absorbing system or as a stationary energy absorbing barrier. In accord with the present invention, the energy absorbing system is particularly suited for use in providing protection to men and equipment, while the latter are engaged in the performance of highway maintenance and repair operations. The energy absorbing system of the present invention is capable of dissipating the energy released during a vehicular collision in such a way that the accelerations and acceleration rates to which vehicles are subjected during such collisions fall within the prescribed guidelines set by the Federal Highway Administration for such occurrences. Moreover, in accordance with the present invention an energy absorbing system has been provided, which is suitable for employment on hilly and curved sections as well as level and straight sections of highways and roads. Furthermore, the energy absorbing system of the present invention is both inexpensive to construct and easy to employ. Finally, in accordance with the present invention an energy absorbing system has been provided, which is capable of being repaired rapidly and inexpensively following its involvement in a vehicular collision.

While only one embodiment of my invention has been shown, it will be appreciated that modifications thereof, some of which have been noted in the preceding description, may readily be made thereto by those skilled in the art. I therefore intend by the appended claims to cover the modifications specifically referred to herein as well as all other modifications, which fall within the true spirit and scope of my invention.

What is claimed is:

1. An energy absorbing system for reducing the severity of vehicular collisions between a moving vehicle and an immovable object, or between a moving vehicle and another moving object comprising:
   a. guidance frame means including an attaching member secured to the object, a pair of parallelly extending substantially hollow structural members each having one end thereof secured to said attaching member, and first support means securing the other end of each of said pair of parallelly extending substantially hollow structural members to the object;
   b. energy absorbing means including a multiplicity of cylindrical members aligned so as to form a row thereof extending substantially parallel to said pair of parallelly extending substantially hollow structural members, one of said multiplicity of cylindrical members being interconnected to said attaching member, said multiplicity of cylindrical members each having an uncollapsed state and a collapsed state, said multiplicity of cylindrical members being interconnected in series relation one to another so as to change from the uncollapsed state to the collapsed state thereof in accord with a predetermined pattern when the object is struck by an errant moving vehicle with said multiplicity of cylindrical members thereby functioning to absorb the energy released during the vehicular collision between the errant moving vehicle and the object; and
   c. impacting plate means including a vertically extending surface designed to be the surface struck by the errant moving vehicle, said vertically extending surface being interconnected to another one of said multiplicity of cylindrical members, and a pair of movable structural members extending in parallel relation to each other and in substantially parallel relation to said pair of parallelly extending substantially hollow structural members, said pair of movable structural members each having the other end thereof received in supported relation within a corresponding one of said pair of parallelly extending substantially hollow structural members for sliding movement relative thereto, said pair of movable structural members being movable between a first position corresponding to the uncollapsed state of said multiplicity of cylindrical members wherein said other end of each of said pair of movable structural members is spaced a predetermined distance away from said other end of each of said pair of parallelly extending substantially hollow structural members and a second position corresponding to the collapsed state of said multiplicity of cylindrical members wherein said other end of each of said pair of movable structural members occupies a position adjacent to said other end of each of said pair of parallelly extending substantially hollow structural members, said pair of movable structural members being caused to move from said first position thereof to said second position thereof as a consequence of said multiplicity of cylindrical members changing from the uncollapsed state to the collapsed state thereof upon the occurrence of a vehicular collision between an errant moving vehicle and the object.

2. The energy absorbing system as set forth in claim 1 wherein said attaching member comprises an attachment plate.

3. The energy absorbing system as set forth in claim 1 further including reinforcing means mounted on said pair of parallelly extending substantially hollow structural members to provide additional strength thereto.

4. The energy absorbing system as set forth in claim 1 wherein said vertically extending surface comprises a reinforced impact plate.

5. The energy absorbing system as set forth in claim 1 wherein said multiplicity of cylindrical members comprises a series of four cylindrical pipes.

6. The energy absorbing system as set forth in claim 5 further including a first pair of substantially v-shaped angles secured in interposed relation between each pair of adjoining ones of said multiplicity of cylindrical pipes adjacent the tops thereof to resist lateral movement between individual ones of said multiplicity of cylindrical pipes during a vehicular collision between an errant moving vehicle and the object.

7. The energy absorbing system as set forth in claim 6 further including a second pair of substantially v-shaped angles secured in interposed relation between each pair of adjoining ones of said multiplicity of cylindrical pipes adjacent the bottoms thereof to resist lateral movement between individual ones of said multiplicity of cylindrical pipes during a vehicular collision between an errant moving vehicle and the object.

8. An energy absorbing system for reducing the severity of a vehicular collision between an errant moving vehicle and a highway service vehicle comprising:
   a. guidance frame means including an attaching member secured to the rear of the highway service vehicle, a pair of parallelly extending structural tubular members each having one end thereof secured to said attaching member, and first support means securing the other end of each of said pair of parallelly extending structural tubular members to the highway service vehicle at a point located in spaced relation to the rear of the highway service vehicle;
   b. energy absorbing means including a multiplicity of cylindrical members aligned so as to form a row thereof extending substantially parallel to said pair of parallelly extending structural tubular members, one of said multiplicity of cylindrical members being interconnected to said attaching member, said multiplicity of cylindrical members each having an uncollapsed state and a collapsed state, said multiplicity of cylindrical members being interconnected in series relation one to another so as to change from the uncollapsed state to the collapsed state thereof in accord with a predetermined pattern when the highway service vehicle is struck by an errant moving vehicle with said multiplicity of cylindrical members thereby functioning to absorb the energy released during the vehicular collision between the errant moving vehicle and the highway service vehicle; and
   c. impacting plate means including a vertically extending impact plate designed to be the surface struck by the errant moving vehicle, said vertically extending impact plate being interconnected to another one of said multiplicity of cylindrical members, and a pair of movable structural members extending in parallel relation to each other and in substantially parallel relation to said pair of parallelly extending structural tubular members, said pair of movable structural members each having the other end thereof received in supported relation within a corresponding one of said pair of parallelly extending structural tubular members for sliding movement relative thereto, said pair of movable structural members being movable between a first position corresponding to the uncollapsed state of said multiplicity of cylindrical members wherein said other end of each of said pair of movable structural members is spaced a predetermined distance away from said other end of each of said pair of parallelly extending structural tubular members and a second position corresponding to the collapsed state of said multiplicity of cylindrical members wherein said other end of each of said pair of movable structural members occupies a position adjacent to said other end of each of said pair of parallelly extending structural tubular members, said pair of movable structural members being caused to move from said first position thereof to said second position thereof as a consequence of said multiplicity of cylindrical members changing from the uncollapsed state to the collapsed state thereof upon the occurrence of a vehicular collision between an errant moving vehicle and the highway service vehicle.

* * * * *